(12) United States Patent
Gregorski et al.

(10) Patent No.: US 7,898,752 B2
(45) Date of Patent: Mar. 1, 2011

(54) OPTICAL PACKAGE COMPRISING AN ADJUSTABLE LENS COMPONENT COUPLED TO A MULTI-DIRECTIONAL LENS FLEXURE

(75) Inventors: Steven Joseph Gregorski, Painted Post, NY (US); Matthew Patrick Hammond, Boston, MA (US)

(73) Assignee: Corning Incorporated, Corning, NY (US)

( * ) Notice: Subject to any disclaimer, the term of this patent is extended or adjusted under 35 U.S.C. 154(b) by 86 days.

(21) Appl. No.: 12/276,509

(22) Filed: Nov. 24, 2008

(65) Prior Publication Data

US 2010/0128369 A1    May 27, 2010

(51) Int. Cl.
    *G02B 7/02* (2006.01)
(52) U.S. Cl. ............... 359/824; 359/813; 359/822; 369/44.15; 720/683
(58) Field of Classification Search .......... 359/813, 359/814, 822–824, 237, 239; 369/44.14–44.16, 369/44.21, 44.22, 44.32, 112.08, 112.23; 720/672, 683–685; 216/117.1, 86.25
    See application file for complete search history.

(56) References Cited

U.S. PATENT DOCUMENTS

| | | | |
|---|---|---|---|
| 5,745,447 A * | 4/1998 | Kang | 369/44.15 |
| 5,768,037 A | 6/1998 | Marino et al. | 359/824 |
| 5,798,875 A | 8/1998 | Fortin et al. | 359/813 |
| 7,162,727 B2 * | 1/2007 | Song et al. | 720/684 |
| 7,221,523 B2 | 5/2007 | Miyagi | 359/819 |
| 7,254,098 B2 | 8/2007 | Pae et al. | 369/44.16 |
| 7,287,264 B2 * | 10/2007 | Akanuma | 720/681 |
| 7,350,222 B2 * | 3/2008 | Hong et al. | 720/684 |
| 7,414,927 B2 * | 8/2008 | Hong et al. | 369/44.15 |
| 2004/0217092 A1 | 11/2004 | Demers et al. | 219/117.1 |
| 2007/0091411 A1 | 4/2007 | Mori et al. | 359/239 |

FOREIGN PATENT DOCUMENTS

| | | |
|---|---|---|
| EP | 1 004 910 | 5/2000 |
| JP | 6-295445 | 10/1994 |
| WO | 91/06022 | 5/1991 |
| WO | 03/104872 | 12/2003 |
| WO | 2005/012977 | 2/2005 |
| WO | 2006/137853 | 12/2006 |

* cited by examiner

*Primary Examiner*—Loha Ben
(74) *Attorney, Agent, or Firm*—Svetlana Z. Short

(57) ABSTRACT

An optical package is provided comprising a lens system, the lens system comprising an adjustable lens component, a plurality of magnetic elements, and a multi-directional lens flexure. The adjustable lens component is mechanically coupled to a lens mounting portion of the multi-directional lens flexure. The magnetic elements comprise at least one fixed magnetic element and at least one motive magnetic element. The arrangement of the fixed and motive magnetic elements relative to each other forms a first fixed/motive element pair and a second fixed/motive element pair. The motive magnetic element of each fixed/motive element pair is mechanically coupled to a motive portion of the multi-directional lens flexure. The structure of the multi-directional lens flexure and the arrangement of the fixed/motive element pairs is such that non-orthogonal repulsive or attractive magnetic force vectors generated between magnetic elements of the respective fixed/motive element pairs generate movement of the adjustable lens component through orthogonal components x, y along X and Y axes of the X-Y optical reference frame.

20 Claims, 6 Drawing Sheets

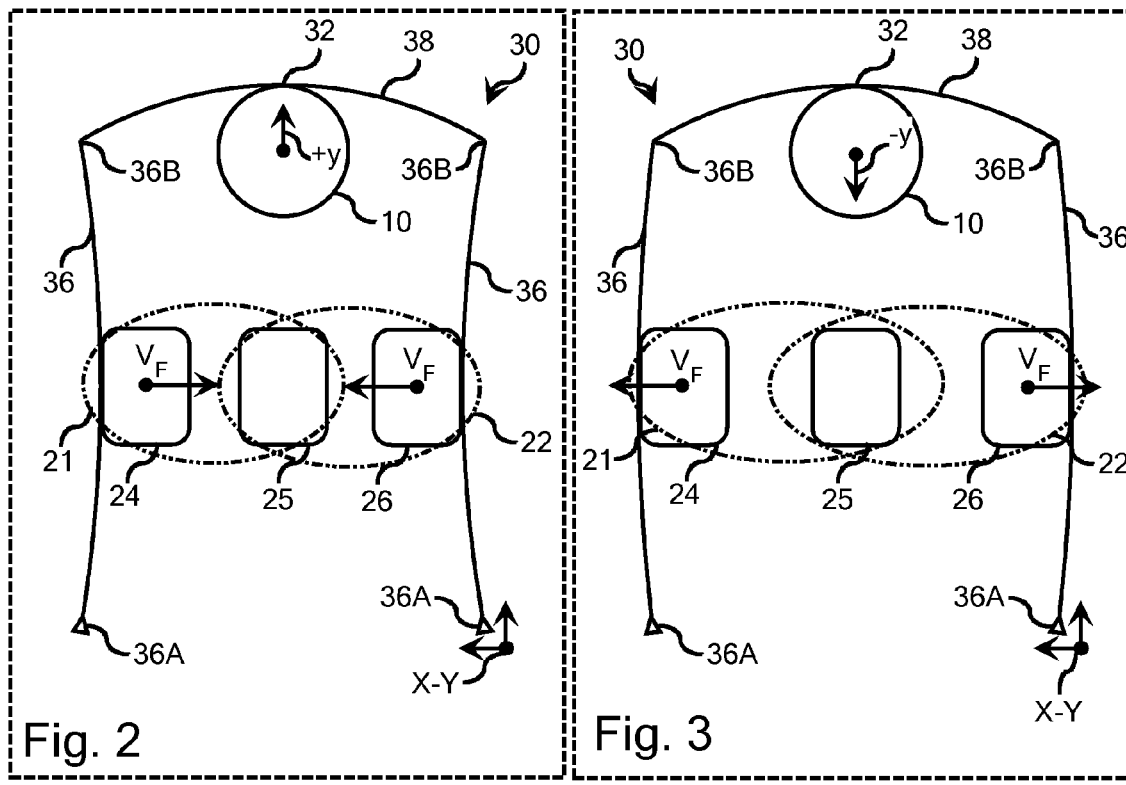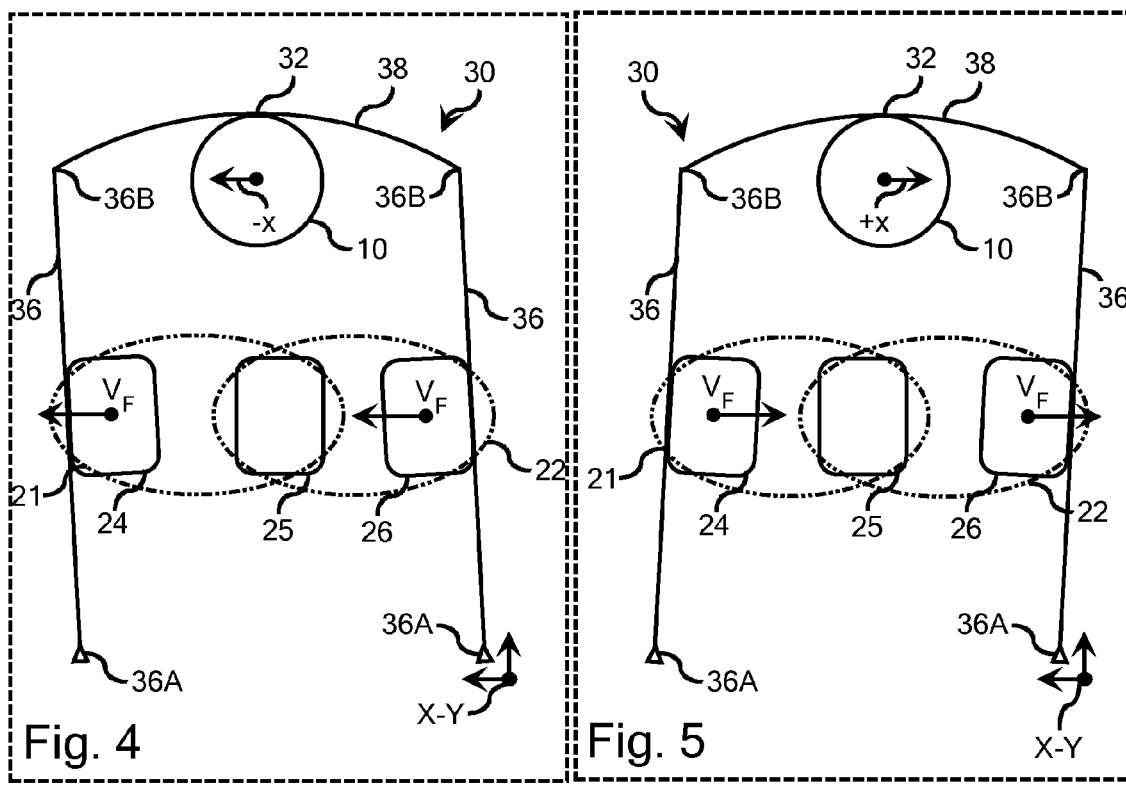

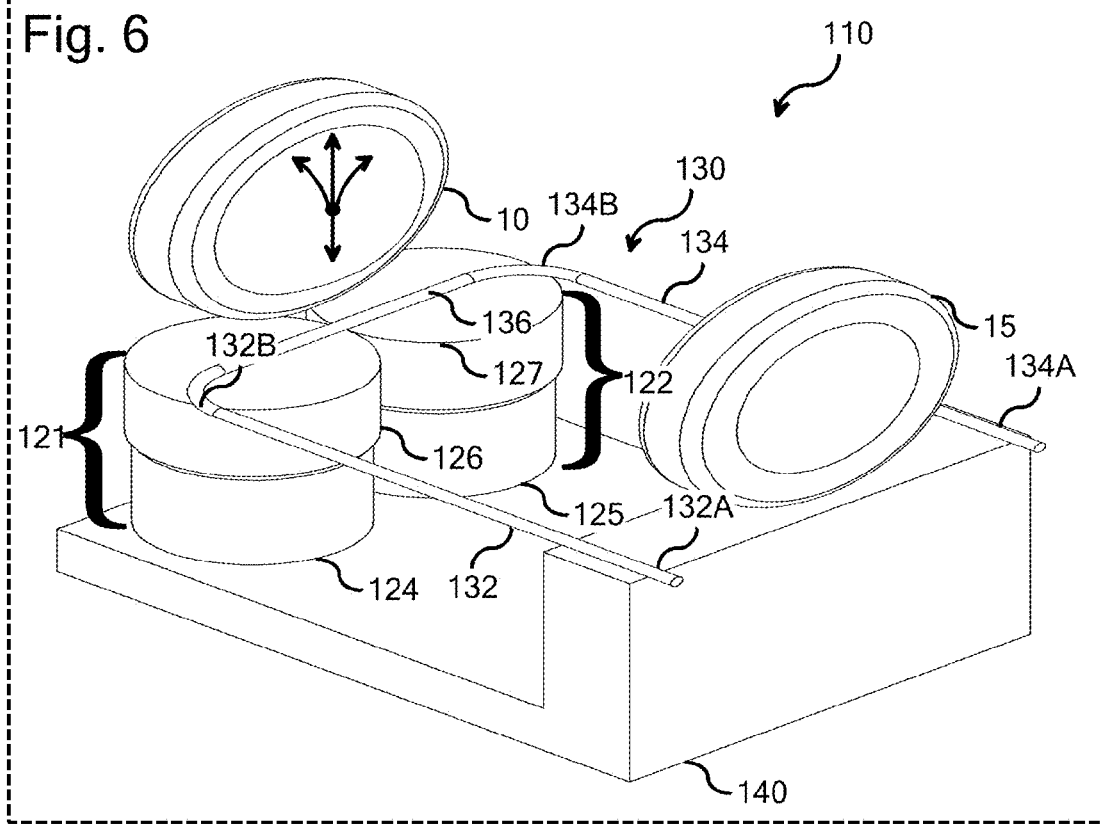
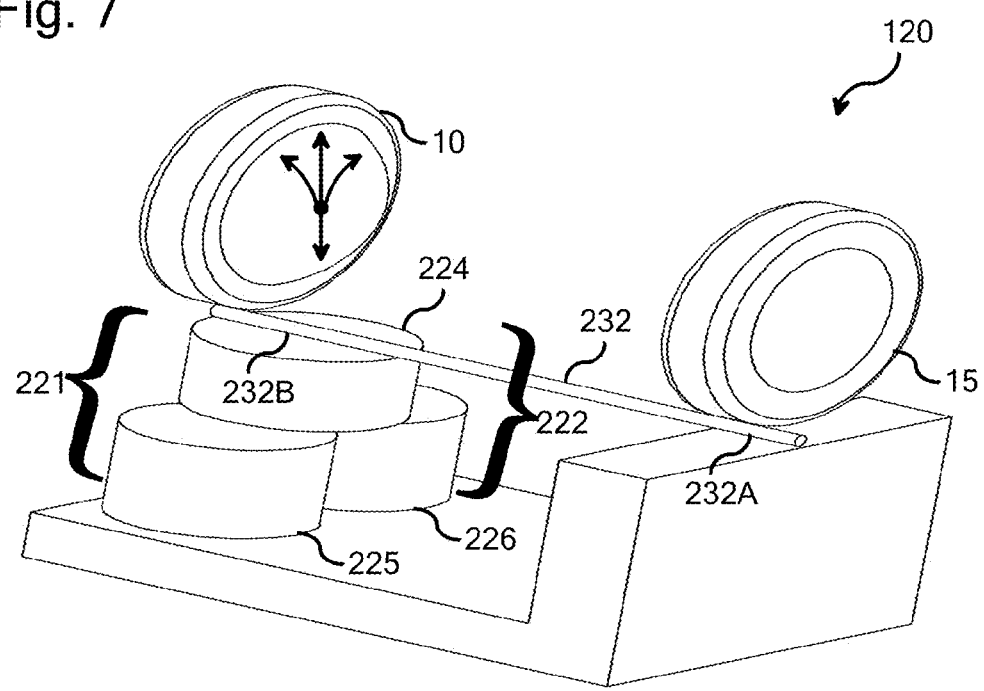

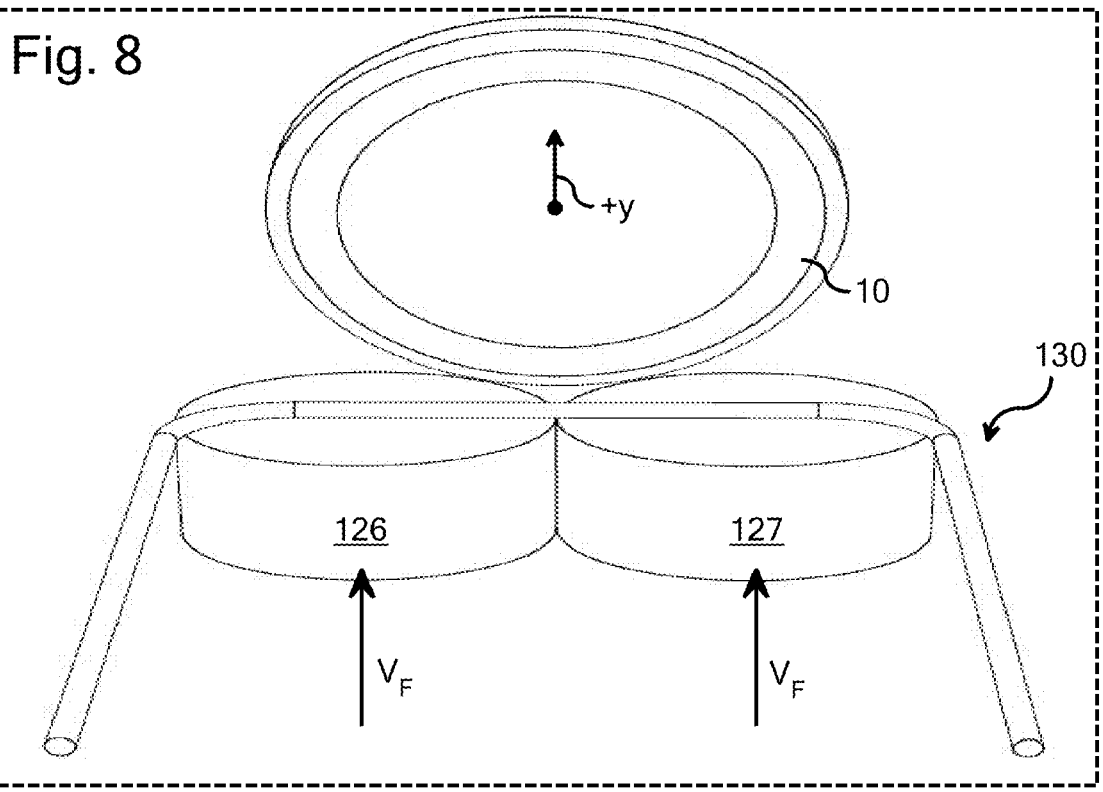
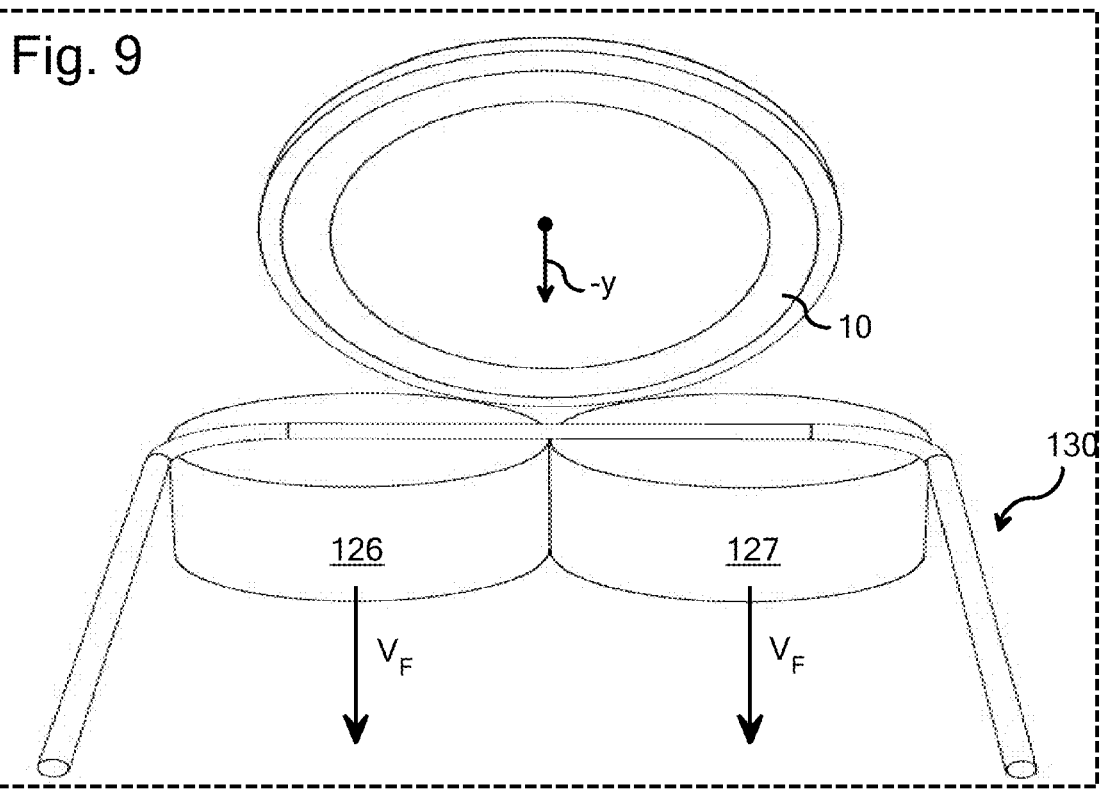

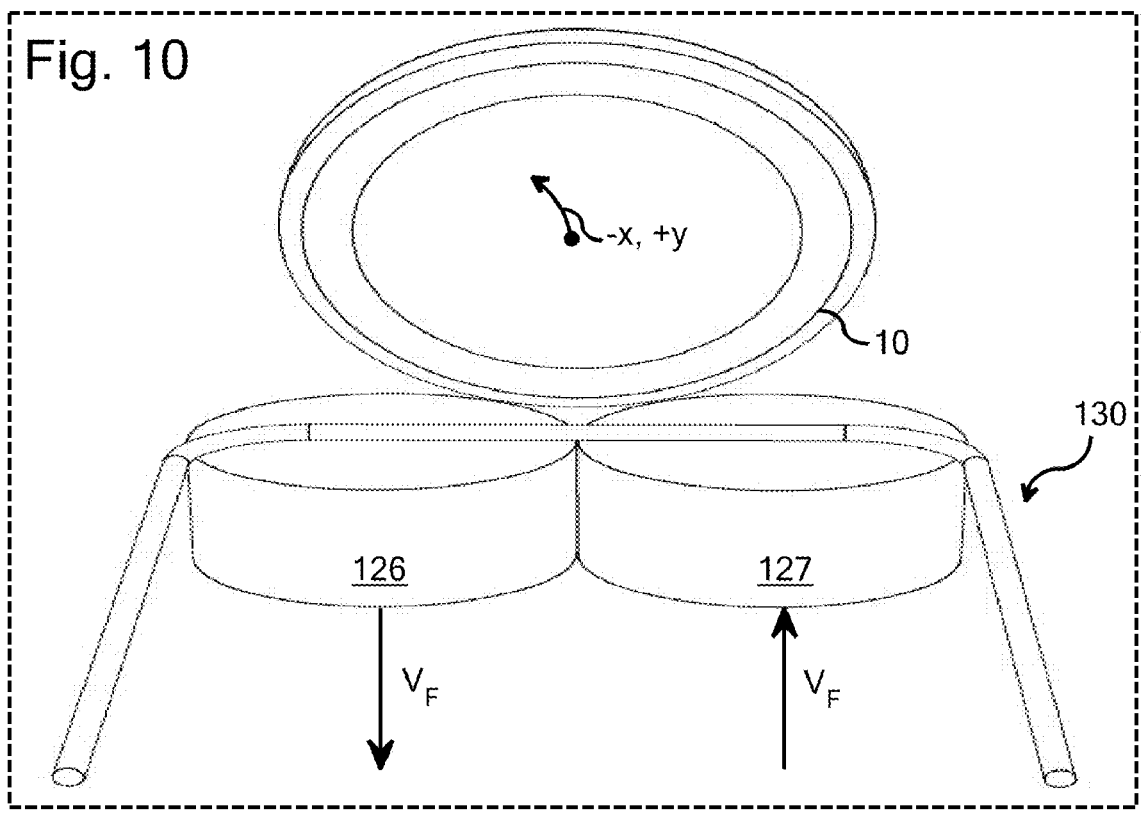
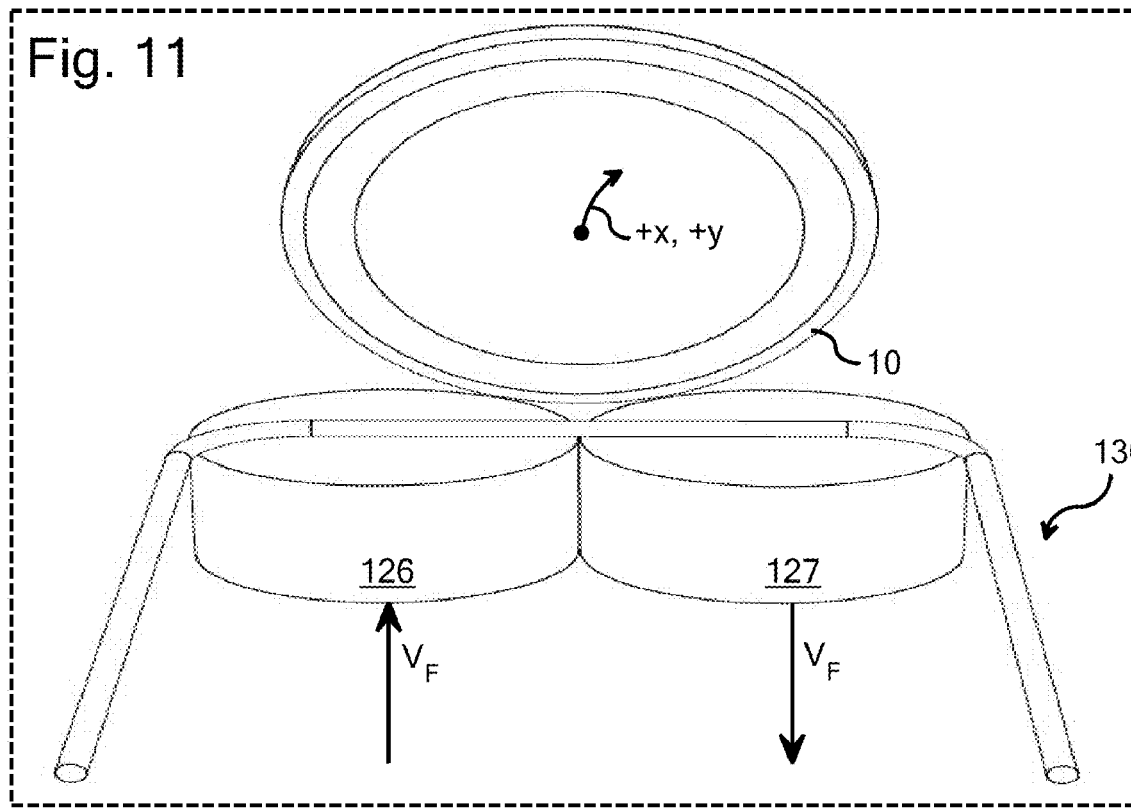

OPTICAL PACKAGE COMPRISING AN ADJUSTABLE LENS COMPONENT COUPLED TO A MULTI-DIRECTIONAL LENS FLEXURE

BACKGROUND OF THE INVENTION

1. Field of the Invention

The present disclosure relates generally to lens systems incorporating one or more lens components that are adjustable in an optical reference frame. Such lens systems enjoy utility in a variety of optical packages including, but not limited to, semiconductor laser optical packages, laser projection systems, and other optical systems where it may be advantageous to provide for the adjustment of an optical component of the system. By way of illustration and not limitation, embodiments of the present disclosure relate generally to optical alignment in packages that include, inter alia, a semiconductor laser and a wavelength conversion device, such as second or third harmonic generation crystal or another type of wavelength conversion device. Embodiments contemplated herein will also find utility in more or less complex optical packages, including those where the adjustable lens component is the only optical component of the package.

2. Technical Background

Short wavelength light sources can be formed by combining a single-wavelength semiconductor laser, such as an infrared or near-infrared distributed feedback (DFB) laser, distributed Bragg reflector (DBR) laser, or Fabry-Perot laser, with a light wavelength conversion device, such as a second harmonic generation (SHG) crystal. The SHG crystal is used to generate higher harmonic waves of the fundamental laser signal. To do so, the lasing wavelength is preferably tuned to the spectral center of the wavelength converting SHG crystal and the output of the laser is preferably aligned with the waveguide portion at the input facet of the wavelength converting crystal.

Waveguide mode diameters of typical wavelength conversion devices, such as MgO-doped periodically poled lithium niobate (PPLN) crystals, can be in the range of a few microns. As a result, it can be very challenging to align the beam from the laser diode with the waveguide of the SHG crystal properly. Accordingly, a variety of adaptive alignment mechanisms have been developed to steer the beam spot of the long wavelength source into proper alignment with the input facet of the waveguide portion of the wavelength conversion device.

BRIEF SUMMARY OF THE INVENTION

According to the present disclosure, lens systems are configured for adaptive alignment and can be used in the aforementioned wavelength converted optical packages, or in any optical package where an adjustable lens component may find utility. In accordance with one embodiment disclosed herein, an optical package is provided comprising a lens system, the lens system comprising an adjustable lens component, a plurality of magnetic elements, and a multi-directional lens flexure. The adjustable lens component is mechanically coupled to a lens mounting portion of the multi-directional lens flexure. The magnetic elements comprise at least one fixed magnetic element and at least one motive magnetic element. The arrangement of the fixed and motive magnetic elements relative to each other forms a first fixed/motive element pair and a second fixed/motive element pair. The motive magnetic element of each fixed/motive element pair is mechanically coupled to a motive portion of the multi-directional lens flexure. The structure of the multi-directional lens flexure and the arrangement of the fixed/motive element pairs is are such that non-orthogonal repulsive or attractive magnetic force vectors generated between magnetic elements of the respective fixed/motive element pairs generate movement of the adjustable lens component through orthogonal components x, y along X and Y axes of the X-Y optical reference frame.

According to one aspect of the present disclosure, the multi-directional lens flexure comprises a pair of upstanding portions and a bridge portion. The pair of upstanding portions are spaced from each other along the X-axis of the X-Y optical reference frame and comprise relatively stationary ends secured relative to the X-Y optical reference frame and relatively free ends connected to each other via the bridge portion. The lens mounting portion to which the adjustable lens component is mechanically coupled is located on the bridge portion of the multi-directional lens flexure and the motive portions to which the motive magnetic elements are mechanically coupled are located on the pair of spaced upstanding portions of the of the multi-directional lens flexure.

According to one aspect of the present disclosure, the multi-directional lens flexure comprises a pair of uni-axial flexures and a bridge portion. Each of the uni-axial flexures comprises a relatively stationary end secured relative to the X-Y optical reference frame and a relatively free end. The relatively free ends of the pair of uni-axial flexures are connected to each other via the bridge portion and the lens mounting portion is located on the bridge portion of the multi-directional lens flexure.

According to one aspect of the present disclosure, the multi-directional lens flexure comprises a uni-axial flexure comprising a relatively stationary end secured relative to the X-Y optical reference frame and a relatively free end. The plurality of magnetic elements comprise a common motive magnetic element and a pair of fixed magnetic elements. The common motive magnetic element is coupled to move with the relatively free end of the uni-axial flexure and the pair of fixed magnetic elements share the common motive magnetic element to form the first and second fixed/motive element pairs.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIGS. 2-5 illustrate the manner in which magnetic elements can be actuated to adjust the lens component of the lens system illustrated in FIG. 1;

FIG. 6 is an isometric illustration of a lens system including a multi-directional lens flexure according to another embodiment of the present disclosure;

FIG. 7 is an isometric illustration of a lens system including a multi-directional lens flexure according to yet another embodiment of the present disclosure;

FIGS. 8-11 illustrate the manner in which magnetic elements can be actuated to adjust the lens component of the lens system illustrated in FIG. 7.

DETAILED DESCRIPTION

Figure 1:
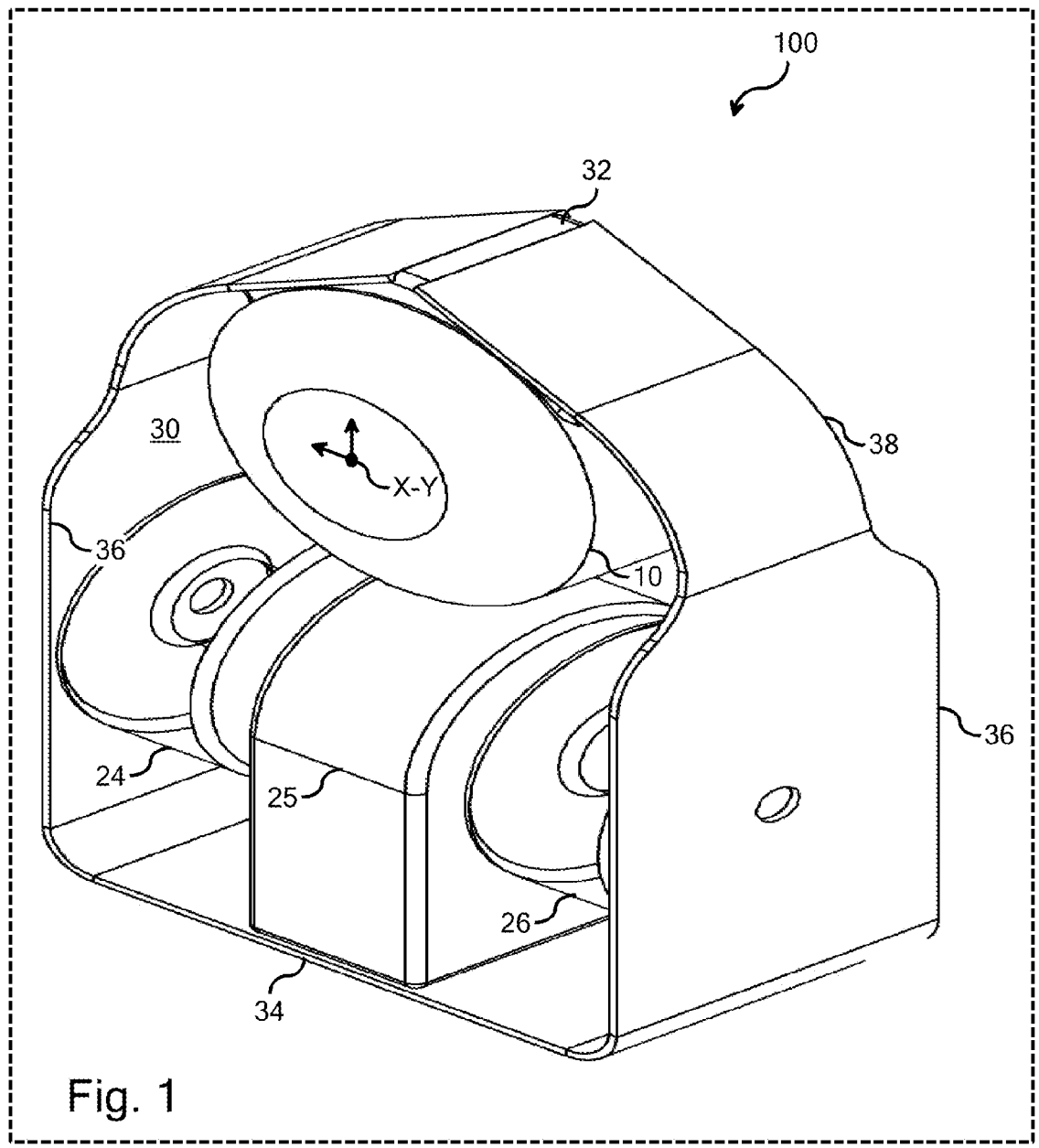
FIG. 1 is an isometric illustration of a lens system including a multi-directional lens flexure according to one embodiment of the present disclosure.

A lens system 100 according to one embodiment of the present disclosure is illustrated in FIG. 1. Generally, the lens system 100 comprises an adjustable lens component 10, a plurality of magnetic elements 24, 25, 26, and a multi-directional lens flexure 30. The adjustable lens component 10 is mechanically coupled to a lens mounting portion 32 of the multi-directional lens flexure 30.

In the illustrated embodiment, one of the magnetic elements 25 is a fixed magnetic element that is mechanically coupled to a fixed portion 34 of the multi-directional lens flexure 30 and the remaining magnetic elements 24, 26 are motive magnetic elements that are mechanically coupled to a motive portion 36 of the multi-directional lens flexure 30. The arrangement of the fixed and motive magnetic elements 24, 25, 26 relative to each other forms a first and second fixed/motive element pairs 21, 22. To facilitate adjustment, each of the first and second fixed/motive element pairs 21, 22 will comprise a magnetic element that is capable of generating a controllable magnetic field, or a controllable response to a magnetic field. For example, an electromagnetic coil may be provided as the fixed or motive magnetic element of a fixed/motive element pair 21, 22.

The structure of the multi-directional lens flexure 30 and the arrangement of the fixed/motive element pairs 21, 22 are such that non-orthogonal repulsive or attractive magnetic force vectors $V_F$ generated between the magnetic elements of the respective fixed/motive element pairs 21, 22 generate movement of the adjustable lens component 10 through orthogonal components x, y along X and Y axes of the X-Y optical reference frame defined by the lens system 100. The multi-directional lens flexure 30 is configured as a spring element defining a resilient spring force that opposes movement of the adjustable lens component through the orthogonal components x, y.

More specifically, each motive magnetic element 24, 26 is mechanically coupled to a different motive portion of the multi-directional lens flexure 30, i.e., the pair of upstanding portions 36 illustrated in FIGS. 1-5. The pair of upstanding portions 36 are spaced from each other along the X-axis of the X-Y optical reference frame and comprise relatively stationary ends 36A secured relative to the X-Y optical reference frame and relatively free ends 36B connected to each other via a bridge portion 38 of the flexure 30. The lens mounting portion 32 of the flexure 30 is located on the bridge portion 38 of the multi-directional lens flexure 30. Referring to FIG. 2, because the multi-directional lens flexure 30 is formed from a relatively flexible material, attractive magnetic force vectors $V_F$ generated between the magnetic elements of the respective fixed/motive element pairs 21, 22 attracts the upstanding portions 36 of the multi-directional lens flexure 30 towards each other along the X-axis of the X-Y optical reference frame. This motion elevates the lens mounting portion 32 of the multi-directional lens flexure 30, and the adjustable lens 10 mounted thereto, along the Y-axis of the X-Y optical reference frame and can be controlled, for example, by using electromagnetic coils and suitable electronic control circuitry as the motive magnetic elements 24, 26.

Similarly, referring to FIG. 3, repulsive force vectors $V_F$ generated between the magnetic elements of the respective fixed/motive element pairs 21, 22 repels the upstanding portions 36 of the multi-directional lens flexure 30 away from each other along the X-axis of the X-Y optical reference frame. This motion lowers the lens mounting portion 32 of the multi-directional lens flexure 30, and the adjustable lens 10 mounted thereto, along the Y-axis of the X-Y optical reference frame.

The multi-directional lens flexure 30 can be formed from a relatively flexible material to define an overall spring-like construction that permits the various deformations described herein and is inclined to return to a resting zero-force configuration. Materials suitable for construction of the flexure include, but are not limited to flexible plastics, relatively thin metal shims, or flexible plastic/metal laminate structures, such as those found in flexible circuit interconnects. The concept of using a flexible plastic/metal laminate structure including electrical circuit interconnects is particularly advantageous in practicing the embodiments disclosed herein because such a configuration would simultaneously provide the mechanical flexure for adjusting the position of the adjustable lens 10 and the electrical interconnections for driving the respective fixed/motive element pairs 21, 22.

FIGS. 4 and 5, illustrate the manner in which attractive and repulsive magnetic force vectors $V_F$ can be combined to generate motion along the X--axis of the X-Y optical reference frame. In FIGS. 4 and 5, two different combinations of repulsive and attractive magnetic force vectors $V_F$ generated between magnetic elements of the respective fixed/motive element pairs causes the upstanding portions 36 of the multi-directional lens flexure 30 to flex in a common direction along the X-axis of the X-Y optical reference frame, shifting a position of the lens mounting portion 32 of the multi-directional lens flexure 30, and the adjustable lens mounted thereto, along the X-axis. Hybrid combinations of the repulsive and attractive force vectors $V_F$ illustrated in FIGS. 2-5 can be used to shift the position of the adjustable lens 10 along the X and Y axes of the X-Y optical reference frame.

A lens system 110 incorporating a multi-directional lens flexure 130 according to another embodiment of the present disclosure is illustrated in FIG. 6 and comprises a pair of uni-axial flexures 132, 134 and a bridge portion 136 to which the adjustable lens component 10 is mechanically coupled. The lens system 110 also includes a relatively stationary lens component 15. Each of the uni-axial flexures 132, 134 comprises a relatively stationary end 132A, 134A, that is secured relative to the X-Y optical reference frame, and a relatively free end 132B, 134B. The free ends 132B, 134B are connected to each other via the bridge portion 136. The multi-directional lens flexure 130 may be formed from a variety of resilient but flexible materials and is configured as a spring element defining a resilient spring force that opposes movement of the adjustable lens component through the orthogonal components x, y.

In the embodiment illustrated in FIG. 6, two of the magnetic elements 124, 125 are fixed magnetic elements that are mechanically coupled to a fixed portion 135 of the multi-directional lens flexure 130 via a rigid base portion 140. The remaining two magnetic elements 126, 127 are motive magnetic elements that are mechanically coupled to the free ends 132B, 134B of the multi-directional lens flexure 130. The arrangement of the fixed and motive magnetic elements 124, 125, 126, 127 relative to each other forms first and second fixed/motive element pairs 121, 122. To facilitate adjustment, each of the first and second fixed/motive element pairs 121, 122 will comprise a magnetic element that is capable of generating a controllable magnetic field, or a controllable response to a magnetic field.

Referring to FIG. 8, the structure of the multi-directional lens flexure 130 and the arrangement of the fixed/motive element pairs 121, 122 of FIG. 6 are such that repulsive magnetic force vectors $V_F$ generated between magnetic elements of the respective fixed/motive element pairs 121, 122 elevate the adjustable lens 10 along the Y-axis of the X-Y optical reference frame. Similarly, referring to FIG. 9, attractive magnetic force vectors $V_F$ generated between magnetic elements of the respective fixed/motive element pairs 121, 122 lower the adjustable lens 10 along the Y-axis of the X-Y optical reference frame. FIGS. 10 and 11 illustrate the manner in which different combinations of repulsive and attractive magnetic force vectors $V_F$ can be used to shift the adjustable lens component along an arced adjustment path having components along the X and Y axes of the optical reference frame. As is the case with the embodiment illustrated with reference to FIGS. 1-5, hybrid combinations of the repulsive and attractive force vectors $V_F$ illustrated in FIGS. 8-11 can be used to shift the position of the adjustable lens component 10 to a variety of positions in the X-Y optical reference frame.

The lens system 120 of FIG. 7 is similar in many respects to the embodiment illustrated in FIG. 6 of the present disclosure, with the exception that the multi-directional lens flexure takes the form of a single uni-axial flexure 232 comprising a relatively stationary end 232A secured relative to the X-Y optical reference frame and a relatively free end 232B to which the adjustable lens component 10 is mounted. In addition, the set of magnetic elements comprise a common motive magnetic element 224 and a pair of fixed magnetic elements 225, 226 arranged such that the fixed magnetic elements 225, 226 share the common motive magnetic element 224 to form the first and second fixed/motive element pairs 221, 222. The common motive magnetic element 224 is coupled to move with the relatively free end 232B of the uni-axial flexure 232. As is the case with the embodiment of FIG. 6, repulsive and attractive magnetic force vectors $V_F$ generated between the magnetic elements of the respective fixed/motive element pairs 221, 222 elevate and lower the adjustable lens component 10 along the Y-axis of the X-Y optical reference frame. Different combinations of repulsive and attractive magnetic force vectors $V_F$ can be used to shift the adjustable lens component 10 to a variety of positions in the X-Y optical reference frame. The flexure 232 may be formed from a variety of resilient but flexible materials and is configured as a flexible rod that defines a resilient spring force that opposes movement of the adjustable lens component through the orthogonal components x, y.

Figure 12:
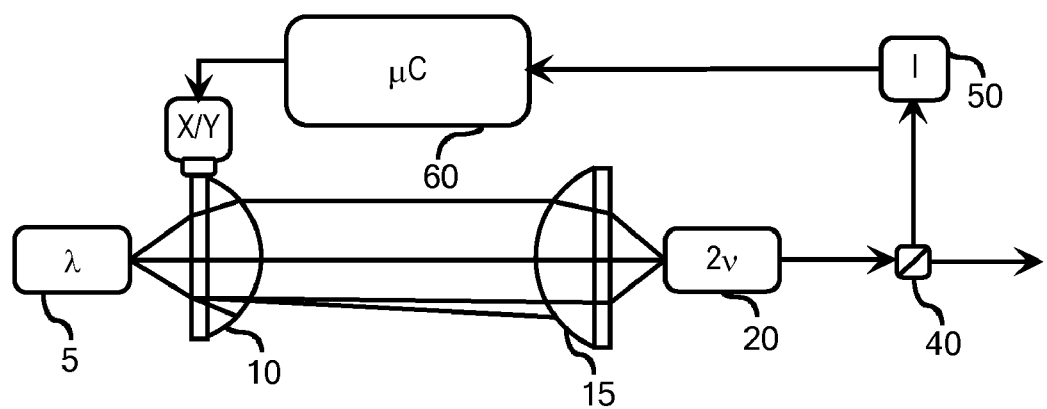
FIG. 12 illustrates a wavelength converting optical package according to one embodiment of the present disclosure.

Although the lens systems disclosed herein can be utilized in a variety of optical packages, the optical package illustrated schematically in FIG. 12 illustrates the utility of providing for optical adjustment in the context of a frequency-doubled optical package comprising a semiconductor laser 5, a wavelength conversion device 20, and a lens system that is configured to optically couple an output beam of the semiconductor laser 5 into a waveguide portion of a wavelength conversion device 20. In the illustrated embodiment, the lens system comprises an adjustable lens component 10 and a stationary lens component 15. The adjustable lens component 10 is adjustable in one or more degrees of freedom relative to an X-Y optical reference frame. The movement of the adjustable lens component 10 adjusts the position of the output beam on the input facet of the wavelength conversion device 20 to optimize the output of the wavelength conversion device 20. Optical packages of this nature can also include a beam splitter 40, an optical intensity monitor 50, and a programmable controller 60 to provide a feedback mechanism for controlling the adjustable optical component 10 as a function of output intensity. Lens systems according to the present disclosure can find utility in more or less complex optical packages, including those where the adjustable lens component is the only optical component of the package.

For the purposes of describing and defining the present invention, it is noted that a "magnetic element" is any structure that comprises a material upon which an attractive or repulsive force can be generated due to the presence of a magnetic field, including but not limited to a permanent magnet, a structure, like an electromagnetic coil, that comprises a permanent magnet, a metal that responds to a magnetic field, a structure that comprises a metal that responds to a magnetic field, or combinations thereof For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present invention being "configured" to embody a particular property, function in a particular manner, etc., are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

Having described the invention in detail and by reference to specific embodiments thereof, it will be apparent that modifications and variations are possible without departing from the scope of the invention defined in the appended claims. For example, although the embodiments illustrated in FIGS. 6 and 7 utilize a stationary lens component 15 in combination with the adjustable lens 10, the stationary lens component 15 need not be provided in every embodiment contemplated by the present disclosure. In addition, although some aspects of the present invention are identified herein as preferred or particularly advantageous, it is contemplated that the present invention is not necessarily limited to these preferred aspects of the invention.

It is noted that one or more of the following claims utilize the term "wherein" to transition from the preamble of the claim to the body of the claim. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An optical package comprising a lens system, the lens system defining an X-Y optical reference frame and comprising an adjustable lens component, a plurality of magnetic elements, and a multi-directional lens flexure, wherein:

the adjustable lens component is mechanically coupled to a lens mounting portion of the multi-directional lens flexure;

the plurality of magnetic elements comprise fixed and motive magnetic elements;

the arrangement of the fixed and motive magnetic elements relative to each other forms a first fixed/motive element pair and a second fixed/motive element pair;

the motive magnetic element of each fixed/motive element pair is mechanically coupled to a motive portion of the multi-directional lens flexure; and the structure of the multi-directional lens flexure and the arrangement of the fixed/motive element pairs are such that non-orthogonal repulsive or attractive magnetic force vectors generated between magnetic elements of the respective fixed/motive element pairs generate movement of the adjustable lens component through orthogonal components x, y along X and Y axes of the X-Y optical reference frame.

2. An optical package as claimed in claim 1 wherein the multi-directional lens flexure comprises a flexible plastic/metal laminate structure including electrical circuit interconnects in electrical communication with the first and second fixed/motive element pairs.

3. An optical package as claimed in claim 1 wherein the plurality of magnetic elements comprise a pair of motive magnetic elements, each of which is coupled to a different motive portion of the multi-directional lens flexure.

4. An optical package as claimed in claim 3 wherein:

the multi-directional lens flexure comprises a pair of upstanding portions and a bridge portion;

the pair of upstanding portions are spaced from each other along the X-axis of the X-Y optical reference frame and comprise relatively stationary ends secured relative to the X-Y optical reference frame and relatively free ends connected to each other via the bridge portion;

the lens mounting portion to which the adjustable lens component is mechanically coupled is located on the bridge portion of the multi-directional lens flexure; and the motive portions to which the motive magnetic elements are mechanically coupled are located on the pair of spaced upstanding portions of the multi-directional lens flexure.

5. An optical package as claimed in claim 4 wherein the structure of the multi-directional lens flexure and the arrangement of the fixed/motive element pairs are such that attractive magnetic force vectors generated between magnetic elements of the respective fixed/motive element pairs attract the upstanding portions of the multi-directional lens flexure towards each other along the X-axis of the X-Y optical reference frame, elevating the lens mounting portion of the multi-directional lens flexure, and the adjustable lens component mounted thereto, along the Y-axis of the X-Y optical reference frame.

6. An optical package as claimed in claim 4 wherein the structure of the multi-directional lens flexure and the arrangement of the fixed/motive element pairs are such that repulsive force vectors generated between magnetic elements of the respective fixed/motive element pairs repel the upstanding portions of the multi-directional lens flexure away from each other along the X-axis of the X-Y optical reference frame, lowering the lens mounting portion of the multi-directional lens flexure, and the adjustable lens component mounted thereto, along the Y-axis of the X-Y optical reference frame.

7. An optical package as claimed in claim 4 wherein the structure of the multi-directional lens flexure and the arrangement of the fixed/motive element pairs are such that a combination of repulsive and attractive magnetic force vectors generated between magnetic elements of the respective fixed/motive element pairs causes the upstanding portions of the multi-directional lens flexure to flex in a common direction along the X-axis of the X-Y optical reference frame, shifting a position of the lens mounting portion of the multi-directional lens flexure, and the adjustable lens component mounted thereto, along the X-axis.

8. An optical package as claimed in claim 4 wherein the structure of the multi-directional lens flexure and the arrangement of the fixed/motive element pairs are such that a hybrid combination of repulsive and attractive force vectors generated between magnetic elements of the respective fixed/motive element pairs shifts the position of the lens mounting portion of the multi-directional lens flexure, and the adjustable lens component mounted thereto, along the X and Y axes of the X-Y optical reference frame.

9. (Original) An optical package as claimed in claim 1 wherein:

the multi-directional lens flexure comprises a pair of uni-axial flexures and a bridge portion;

each of the uni-axial flexures comprises a relatively stationary end secured relative to the X-Y optical reference frame and a relatively free end;

the relatively free ends of the pair of uni-axial flexures are connected to each other via the bridge portion; and the lens mounting portion to which the adjustable lens component is mechanically coupled is located on the bridge portion of the multi-directional lens flexure.

10. An optical package as claimed in claim 9 wherein:

the plurality of magnetic elements comprise a motive magnetic clement coupled to each of the pair of uni-axial flexures to move with the respective relatively free ends of the uni-axial flexures; and the structure of the multi-directional lens flexure and the arrangement of the fixed/motive element pairs are such that repulsive magnetic force vectors generated between magnetic elements of the respective fixed/motive element pairs elevate the lens mounting portion of the multi-directional lens flexure, and the adjustable lens component mounted thereto, along the Y-axis of the X-Y optical reference frame.

11. An optical package as claimed in claim 9 wherein:

the plurality of magnetic elements comprise a motive magnetic element coupled to each of the pair of uni-axial flexures to move with the respective relatively free ends of the uni-axial flexures; and the structure of the multi-directional lens flexure and the arrangement of the fixed/motive element pairs are such that attractive magnetic force vectors generated between magnetic elements of the respective fixed/motive clement pairs lower the lens mounting portion of the multi-directional lens flexure, and the adjustable lens component mounted thereto, along the Y-axis of the X-Y optical reference frame.

12. An optical package as claimed in claim 9 wherein the structure of the multi-directional lens flexure and the arrangement of the fixed/motive element pairs are such that a combination of a repulsive magnetic force vector generated between the magnetic elements of one of the fixed/motive element pairs and an attractive magnetic force vector generated between the magnetic elements of another of the fixed/motive element pairs shifts the position of the lens mounting portion of the multi-directional lens flexure, and the adjustable lens component mounted thereto, along an adjustment path having components along the X and Y axes of the optical reference frame.

13. An optical package as claimed in claim 12 wherein the adjustment path comprises an arc.

14. An optical package as claimed in claim 1 wherein:
the multi-directional lens flexure comprises a uni-axial flexure comprising a relatively stationary end secured relative to the X-Y optical reference frame and a relatively free end; and
the plurality of magnetic elements comprise a common motive magnetic element and a pair of fixed magnetic elements;
the common motive magnetic element is coupled to move with the relatively free end of the uni-axial flexure; and
the pair of fixed magnetic elements share the common motive magnetic element to form the first and second fixed/motive element pairs.

15. An optical package as claimed in claim 14 wherein the structure of the multi-directional lens flexure and the arrangement of the fixed/motive element pairs are such that repulsive magnetic force vectors generated between magnetic elements of the respective fixed/motive element pairs elevate the lens mounting portion of the multi-directional lens flexure, and the adjustable lens component mounted thereto, along the Y-axis of the X-Y optical reference frame.

16. An optical package as claimed in claim 14 wherein the structure of the multi-directional lens flexure and the arrangement of the fixed/motive element pairs are such that attractive magnetic force vectors generated between magnetic elements of the respective fixed/motive element pairs lower the lens mounting portion of the multi-directional lens flexure, and the adjustable lens component mounted thereto, along the Y-axis of the X-Y optical reference frame.

17. An optical package as claimed in claim 14 wherein the structure of the multi-directional lens flexure and the arrangement of the fixed/motive element pairs are such that a combination of a repulsive magnetic force vector generated between the magnetic elements of one of the fixed/motive element pairs and an attractive magnetic force vector generated between the magnetic elements of another of the fixed/motive element pairs shifts the position of the lens mounting portion of the multi-directional lens flexure, and the adjustable lens component mounted thereto, along an arc-shaped adjustment path having components along the X and Y axes of the optical reference frame.

18. An optical package as claimed in claim 1 wherein each of the first and second fixed/motive element pairs comprise at least one electromagnetic coil, the electromagnetic coil forming the fixed or motive magnetic element.

19. An optical package as claimed in claim 1 wherein the multi-directional lens flexure is configured as a spring element defining a resilient spring force that opposes movement of the adjustable lens component through the orthogonal components x, y.

20. An optical package as claimed in claim 1 wherein:
the optical package comprises a semiconductor laser, a wavelength conversion device, and the lens system; and
the lens system optically couples an output beam of the semiconductor laser into a waveguide portion of the wavelength conversion device.

* * * * *